United States Patent [19]
Mueller et al.

[11] 3,729,998
[45] May 1, 1973

[54] ELECTRONIC, DIGITAL THERMOMETER

[75] Inventors: Fritz Kurt Mueller; Billy Otis Martin; James Parker Chandler; Robert Cherry Martin, all of Huntsville, Ala.

[73] Assignee: Royal Medical Corporation, Huntsville, Ala.

[22] Filed: Aug. 10, 1970

[21] Appl. No.: 62,481

[52] U.S. Cl. ............................73/362 AR, 206/16.5
[51] Int. Cl. ............................G01k 7/24, G01k 1/08
[58] Field of Search ..................73/362 AR; 206/16.5

[56] References Cited

UNITED STATES PATENTS

| | | | |
|---|---|---|---|
| 3,673,868 | 7/1972 | Beury et al. | 73/362 AR X |
| 3,356,980 | 12/1967 | Roberts | 73/362 AR X |
| 3,540,283 | 11/1970 | Dean | 73/362 AR |
| 3,025,706 | 3/1962 | Oppenheim | 73/362 AR |
| 3,349,896 | 10/1967 | Ensign et al. | 73/362 AR X |
| 3,477,292 | 11/1969 | Thornton | 73/362 AR |
| 2,938,385 | 5/1960 | Mack et al. | 73/362 AR |
| 3,254,533 | 6/1967 | Tongret | 73/362 AR |
| 2,915,175 | 12/1959 | Diamant | 206/16.5 |
| 2,195,019 | 3/1940 | Bloomheart | 73/362 AR |
| 3,174,144 | 3/1965 | O'Neill | 340/324 |
| 3,550,448 | 12/1970 | Ensign | 73/362 AR X |
| 3,377,862 | 4/1968 | Gheorghiu | 73/362 AR |
| 3,139,753 | 7/1964 | Brudner | 73/362 AR |
| 3,348,415 | 10/1967 | Ash | 73/362 AR |
| 3,213,441 | 10/1965 | Shook | 340/324 |

*Primary Examiner*—Louis R. Prince
*Assistant Examiner*—Frederick Shoon
*Attorney*—Alvin Edward Moore

[57] ABSTRACT

An electronic thermometer having a probe for insertion into the mouth or other cavity where temperature is to be measured; disposable probe sheaths that are easily assembled with and removed from the probe; an electronics system comprising means for preheating the mouthward end of the probe, thus achieving very quick temperature measurement; and a digital temperature indicator. The invention includes means for quickly disengaging the disposable sheath from the probe and means for supporting the assembly on a nurse's hospital board or from a neck strap. The electric circuitry receives power from batteries that are permanently fixed to a removable and quickly replaceable bottom (back) cover of the case.

34 Claims, 16 Drawing Figures

United States Patent
Mueller et al.

[11] 3,729,998
[45] May 1, 1973

Patented May 1, 1973

FRITZ K. MUELLER,
BILLY O. MARTIN,
JAMES P. CHANDLER,
AND
ROBERT C. MARTIN,
INVENTORS,

BY

*Alvin E. Moore,*

ATTORNEY.

Patented May 1, 1973

FRITZ K. MUELLER,
BILLY O. MARTIN,
JAMES P. CHANDLER,
AND
ROBERT C. MARTIN,
INVENTORS,

BY

*Alvin E. Moore,*
ATTORNEY.

FRITZ K. MUELLER,
BILLY O. MARTIN,
JAMES P. CHANDLER,
AND
ROBERT C. MARTIN,
INVENTORS,

*Alvin E. Moore*

ATTORNEY.

FIG. 10

FRITZ K. MUELLER,
BILLY O. MARTIN,
JAMES P. CHANDLER,
AND
ROBERT C. MARTIN,
INVENTORS,

Patented May 1, 1973

FRITZ K. MUELLER,
BILLY O. MARTIN,
JAMES P. CHANDLER,
AND
ROBERT C. MARTIN,
INVENTORS,

BY

Alvin E. Moore,
ATTORNEY.

ELECTRONIC, DIGITAL THERMOMETER

For over two centuries thermometers have been of the analog type. In recent years some electronic thermometers have been invented, but these are mostly of the analog type, difficult to read accurately, and require considerable time in a patient's mouth or in other places, for example in industrial use, where measurement of temperature is needed.

In view of the above facts three of the objects of the present invention are to provide a thermometer that: (1) requires very little time of operation (10 seconds or less); (2) is highly accurate, being quickly readable in degrees and tenths of degrees; (3) avoids infection when (as is preferred) the instrument is used to measure patient's temperature. Some other objects of the invention are to invent: (1) a thermometer comprising a small case having a windowed, digital readout surface, capable of being supported on a nurse's hospital board or around her neck, containing a small electronics system; and a probe, sheathed in a disposable cover, for insertion into a patient's mouth (or alternatively an industrial material); (2) such a thermometer in which the electronics system and probe comprise means for preheating the probe to reduce the time necessary for the thermometer to remain in the patient's mouth (or industrial material); (3) a thermometer of this kind comprising a novel combination of probe and a disposable sheath that is easily detached from a stored group of sheaths and easily detached from the probe; and such a thermometer comprising a digital readout system that indicates by red light the degrees measured, both below and above 100°.

These and other objects of the invention will become more readily apparent in the following specifications and the accompanying drawings.

Figure 1:
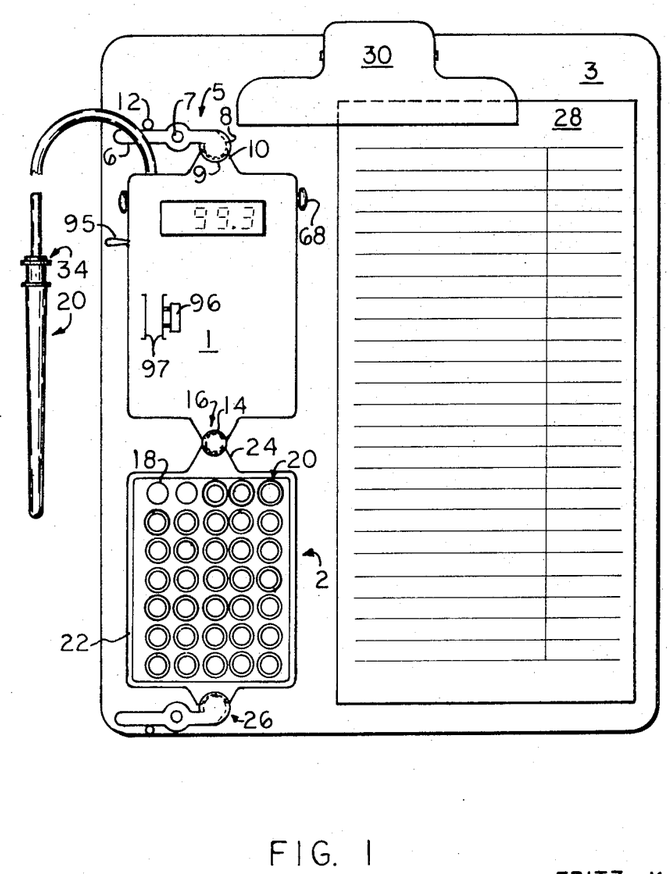
FIG. 1 is a top plan view of a nurse's hospital board, supporting the invented electronic thermometer, disposable probe covers and a temperature chart.
Figure 2:
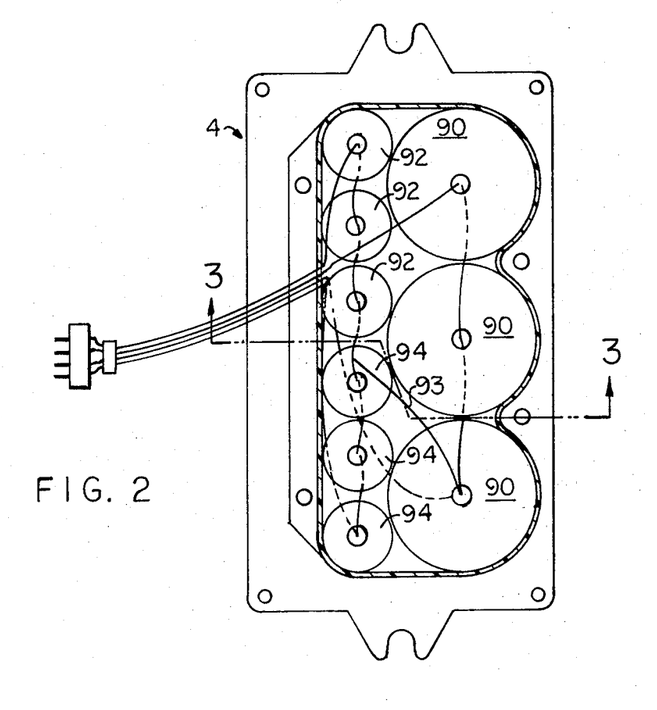
FIG. 2 is a sectional view, from the plane 2—2 of FIG. 3, of the detachable bottom cover of the case, showing the batteries that are fixed to it.
Figure 3:
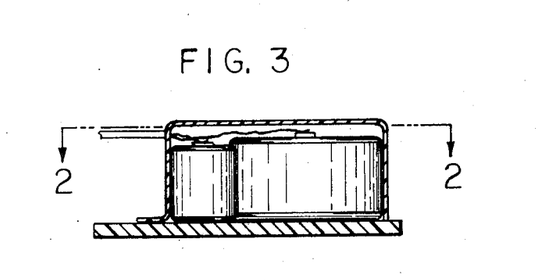
FIG. 3 is an end elevational view of the unit of FIG. 2, in section from the plane 3—3 of FIG. 2.

In FIGS. 1, 2, and 3 of the drawings: the case or container of the thermometer is shown at 1; a package of disposable probe sheaths at 2; a nurse's hospital board at 3; and the assembly of the batteries and bottom box cover at 4. Preferably the batteries are rechargeable; but optionally the batteries and the removable bottom cover of the case, shown in FIGS. 2 and 3, may be discarded and replaced.

The electronics case 1 is detachably fastened to the board 3 by a spring-actuated clip 5 and the stud 16. The clip 5 comprises: a bellcrank lever 6, pivoted to the board at 7, having an end part 8 and an overlying flange 9; and a coil spring, coiled around the pivot pin 7, having one end fastened to the board and the other fixed to the end of the lever having the part 8, continually urging this part into tight engagement with the curved upper surface of the end projection 10 of the case. When the case is taken off the board the stop pin 12 limits rotary movement of the lever.

The case is positioned on the board by moving the lever handle 6 downward, shoving the lower, indented projection of the cover downward under the head 14 of the stud 16, and releasing the lever, so that its part 8 moves into engagement with the recess or socket 9.

The box 2 of disposable probe covers or sheaths comprises:

sockets or wells 18, into each of which a disposable probe sheath 20 may be placed where it rests in upright position; and a cover, having a flange fitting around the top edge of wall 22, this box in FIG. 1 being shown without the cover, which has been removed by the nurse in her operation of the thermometer. At the top of each end of wall 22 there is a lug 24, one of which fits under head 14 of the stud 16, and the other is fixed to the spring-pressed clip 26, which is similar to the clip 5.

A nurse's temperature chart 28 is held on the board by the spring-pressed clip 30. In FIG. 1 the digital temperature indicator 32 is registering the below-normal temperature of the last patient whose temperature has been measured.

Figure 4:
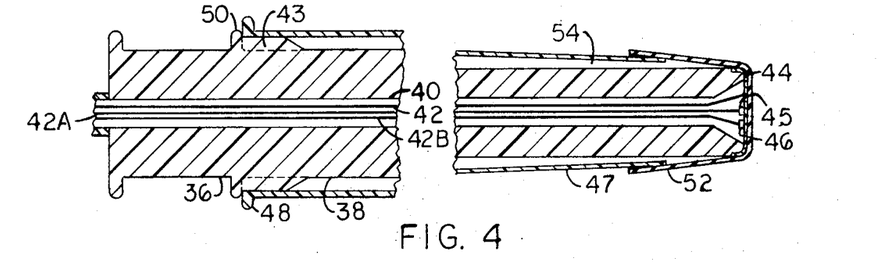
FIG. 4 is a sectional view of one form of assembled probe and sheath, in section from a plane thru the axis of the probe and partly broken away.
Figure 10:
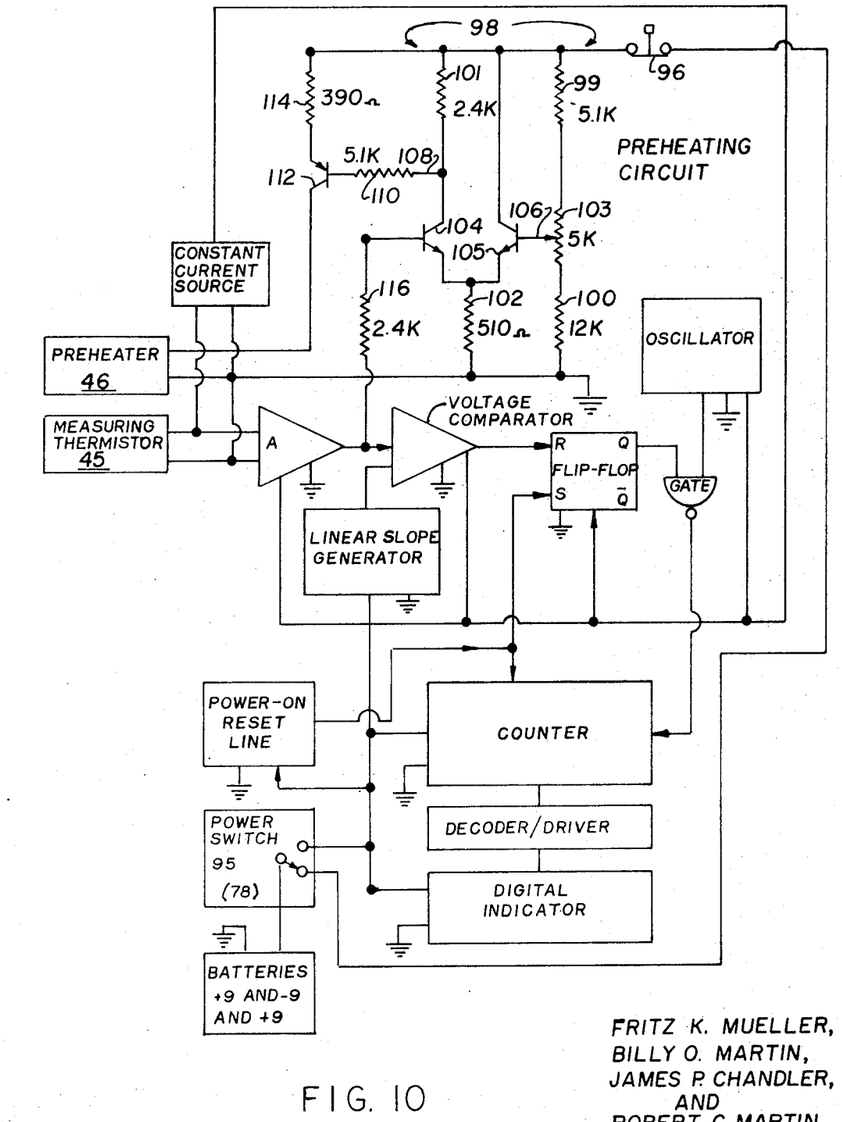
FIG. 10 is a block diagram of the electronics system used in the thermometer, with the preheating circuit block being schematically shown.

The probe 34 is shown in FIG. 1 as conical and in a conical sheath 20. Preferably this probe-and-sheath assembly is in one of the two forms shown in FIGS. 4 to 9. In FIG. 4 the probe, illustrated as being of plastic is shown as comprising: a handle 36; a frusto-conical portion 38; a bore 40, thru which three enameled or varnished electrical wires 42, 42A and 42B extend; at least two diametrically positioned longitudinal ribs 43, which frictionally hold the inner end of the disposable probe sheath; the metal probe-end plate 44 (preferably of gold foil); and the thermistors 45 and 46. These thermistors are fixed to the probe-end plate, for example by soldering, and comprise known thermistor material (semi-conductive metallic oxides). This material has a large change of resistance with change of temperature, and, as pointed out below, the resulting voltage change is measured. As indicated in FIG. 4 and FIG. 10, one of these thermistors (46) is used to preheat the end of the probe. Optionally, but not preferably, an ordinary type of resistance (for example comprising carbon) may be substituted for this preheating thermistor.

As shown in FIG. 4, the probe sheath (which is preferably of molded plastic) comprises: frusto-conical part 47; the stop flange 48, which in use abuts the annular handle stop 50; and the sheath tip 52, which is made separately from part 47 and bonded to it, by heat or glue. In this form the portion 47 preferably is of resilient plastic (thicker and stronger than the material of 52), but optionally it may be of rigid or semi rigid plastic. In both forms at least the tip portion 52 is of resilient rubber or other resilient plastic. The overall length of the sheath is slightly shorter than the distance between the stop 50 and the outer surface of the plate (foil) 44, so that when the nurse places a sanitary sheath on the probe she stretches the sheath against its resilient tip until the other, inward end of the sheath rides into a firm seat over the low ribs 43 and the flange 48 abuts stop 50. Then, after measurement of temperature, she holds the flange 48 (which preferably is annular, but optionally may be in the form of a tab) between thumb and finger, and pulls it toward the tip 52. The resiliency of the sheath aids in quick removal of the sheath; and it is then discarded.

Figure 8:
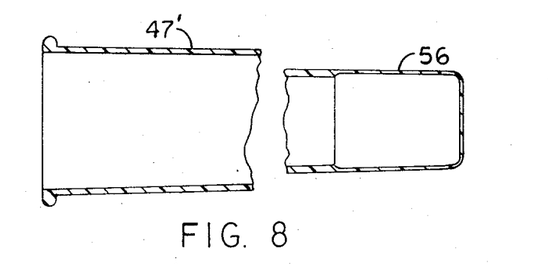
FIG. 8 is a sectional view, partly broken away, of an optional, integral form of the disposable sheath.
Figure 9:
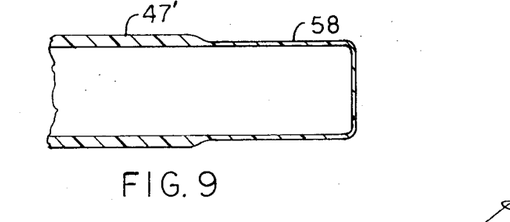
FIG. 9 is a sectional view, partly broken away, of another form of the integral sheath.

FIGS. 8 and 9 show two other, optional, forms of the disposable sheath. In each of these forms the main part 47' and the tip portion are integral and preferably entirely of molded resilient plastic. As in FIG. 4, when it is over the probe it has a clearance 54 between nearly all of its inner surface and the probe. In FIG. 8, the inner surface of its thinner tip portion 56 is shown as being of larger diameter and spaced farther from the probe than its main portion 47'. In FIG. 9 the outer surface of the tip part 58 is of less diameter than the adjoining portion of the main part 47'. As in the form of FIG. 4, the integral sheath shown in FIG. 8 or FIG. 9 is slightly shorter than the distance between 50 and the outer surface of 44; and this integral sheath is similarly assembled with and removed from the probe.

Figure 8A:
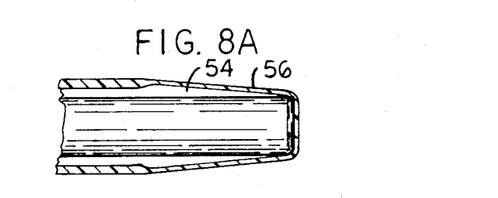
FIG. 8A is a detail sectional view of the assembled outer ends of the sheath of FIG. 8 and the probe.

For convenience of illustration in FIGS. 8 and 9 the integral sheath tip (56 or 58) is shown as it is shaped in the plastic mold; but in practice when the sheath is not on the probe this thin tip is somewhat collapsed. As shown in FIG. 8A, when the sheath is pulled over the probe the tip part is stretched or expanded into frusto-conical shape. Being thinner, it stretches considerably more than does the part 47'.

Figure 5:
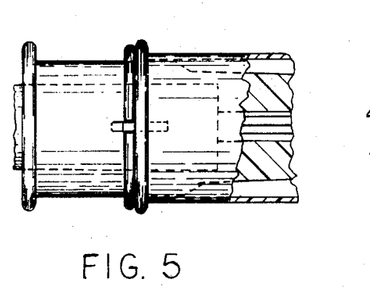
FIG. 5 is a plan view, partly in section and partly broken away, of another form of such assembly, indicating a slide for aid in taking a used cover off the probe.
Figure 6:
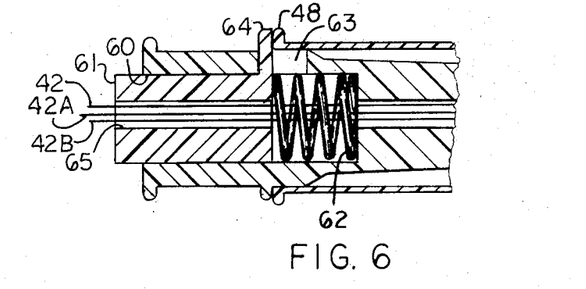
FIG. 6 is a sectional view, partly broken away, of the probe of FIG. 5, in section from a plane thru the axis of the probe and at right angles to the sectional plane of FIG. 5.
Figure 7:
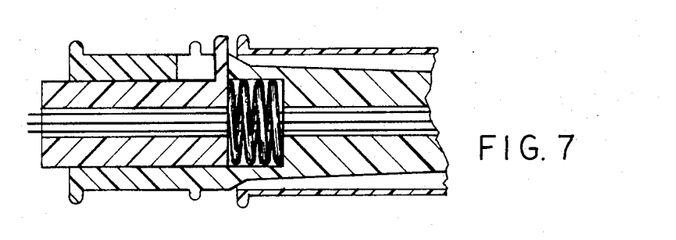
FIG. 7 is a sectional view, similar to FIG. 6, showing the slide as having been moved to dislodge the sheath from frictional engagement with the probe.

In each of the forms of the sheath its flange may be directly pulled away from stop 50 by the fingers, aided by the resilience of at least the tip; or optionally and as shown in FIGS. 5 to 7, a latch-like spring-biased, sheath-removing member may be incorporated in the probe. This member comprises: a socket or cylinder 60 in the handle end of the probe; a sliding element 61, reciprocable in the socket; a spring 62, continually urging the sliding element toward the inward end of the probe; a slot 63 between the socket 60 and the outer surface of the probe; and an element 64, fixed to and preferably integral with the slide 61, projecting radially out of the probe proper, contiguous with the flange 48 when the sheath is stretched over the probe.

As illustrated, the slide 61 is cylindrical, in a socket that is concentric with the bore 40, and has a bore 65 that is in registry with 40 and contains the wires 42, 42A, and 42B. But optionally this sliding element and its socket may be to one side of the bore 40, and the slide then may be solid.

In use of this sheath-removing member, the operator presses the inner end of slide 61 toward the spring, thus forcing the flange 48 off the ribs 43. Then the resilience of the sheath tip pulls the flange further from the probe handle, and into the position shown in FIG. 7. From this position the disposable sheath easily slides off the probe when its outer end is tipped downward.

Figure 15:
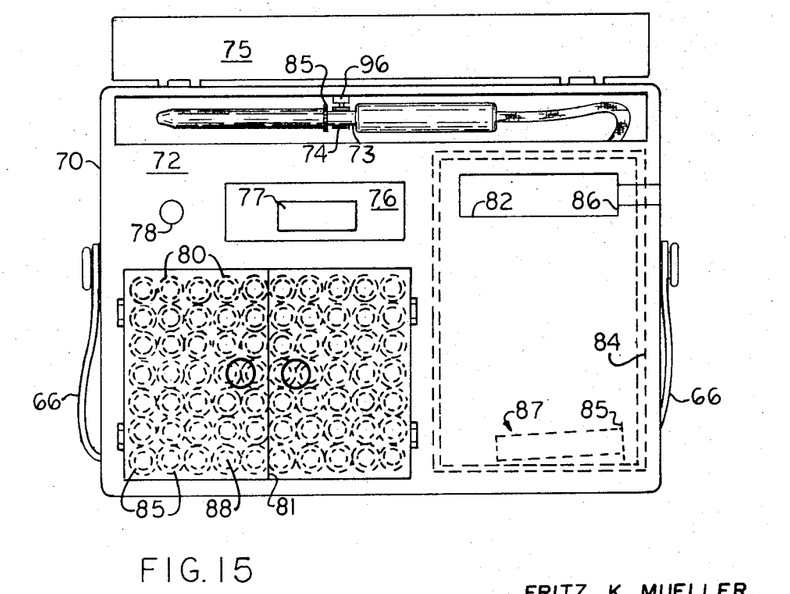
FIG. 15 is a plan view of another type of the assembly of supporting means, probe and disposable sheaths.

As shown in FIG. 1 the case optionally may be supported by the board 3; or alternatively the case may be removed from the board, a strap of the type shown at 66 in FIG. 15 may be connected to the pivots 68, and the case supported from the neck of the user by the strap.

In FIG. 15 a temperature-measuring assembly is shown as entirely supportable from the neck by the strap 66. This assembly comprises: a box or container 70, having a top or forward cover 72; a probe, 73, detachably held in a well or slot of the box (of the top of the box when it is supported by the strap) by means of the friction catch or clasps 74 that are fixed to the back wall of the box; a hinged lid 75, for the probe slot; an electronics assembly and case, 76, comprising a set of batteries and circuitry of the type shown in FIGS. 1 to 3 and 10; an indicator 77; a push-button control switch 78; a pack of sanitary probe sheaths, 80, contained in a corner of the box and accessible thru a slot in the cover 72 after one of the two friction-clasp-held doors 81 is opened; a slot 82, into which the probe and a sheath may be inserted for sheath removal; and a removable receptacle 84, for temporary storage of discarded probe sheaths, located in a corner of the box, removable thru an opening in the back wall.

In removal of a used probe sheath, the operator inserts the sheathed probe in the slot 82 with its flange 85 (similar to flange 48 in FIGS. 4 to 8) within the slot and adjacent to the abutment wall 86 and the probe handle outside the slot and box. Then the handle is pulled away from abutment 86, thus forcing off the used sheath, which falls into the storage receptable as indicated at 87. In resheathing the probe, the operator inserts its outer end into one of the sheath openings 88 and pushes it toward the back of the box until the resilient tip is stretched and the bore of the flange 85 is firmly seated on the ribs 43 (not shown in FIG. 15 but utilized in the device of that figure). The container of the pack of sheaths 80 is a little deeper than the full lengths of the sheaths. Optionally this pack, as well as that of FIG. 1, may have a cover of easily peelable frangible plastic. This cover optionally may be in frangible and peelable strips.

The electronics system utilized in the thermometer is shown in FIG. 10. As indicated in FIGS. 2, 3, and 10 two sets of batteries are used. The three batteries 90 provide 6 positive volts; the three batteries 92 supply 9 volts that are positive with respect to the ground lead 93; and the three batteries 94 supply 9 volts that are negative with respect to ground lead 93. The 6-volt positive current is used primarily to operate the digital indicator; optionally it may also be used in addition to other voltage to provide proper biasing of the transistors. The positive and negative voltages are required for proper operation of the commercially available integrated-circuit amplifiers.

In operation of the main measuring and indicating circuit, the operator moves the power switch (for example the toggle switch 95 shown in FIG. 1 or the pushbutton type of switch shown at 78 in FIG. 15) to connect all the batteries to the circuit. With reference to FIG. 10, voltage is thus supplied to the constant-current source, amplifier, voltage comparator, linear slope generator, flip-flop element, oscillator, counter and digital indicator. The constant-current source, a known type of transistor circuit, causes a small, constant-amperage current to flow to the measuring thermistor, 45. This current causes a voltage drop across the measuring thermistor which is proportional to the resistance in the semi-conductive material of the thermistor and therefore is proportional to the temperature of the thermistor. The resulting small voltage is amplified in the amplifier and supplied to the voltage comparator. This compares the voltage from the amplifier with that from the linear slope generator. The voltage from the amplifier is gradually increasing with the increase in temperature in the mouth. The voltage from the linear slope generator is changing at a known constant rate toward the voltage from the amplifier. This generator is designed to achieve equality in these voltages after a time which is sufficient for the thermistor to reach a stable temperature in the mouth. In the absence of the preheating system of this invention (described below) this time amounts to the neighborhood of the approximately three minutes required in the use of mercury thermometers. At this time the comparator is not supplying voltage to the flip-flop switch.

In the meantime the known constant-frequency voltage from the oscillator is actuating the counter. This counter, of known type, comprises a circuit for counting in tenths of a degree, a circuit for counting in units and a circuit for counting in tens. The counter is preset to begin counting at a predetermined number of degrees, less than any probable mouth temperature, for example 90°; and it accordingly actuates the digital indicator. From this figure the counter and indicator steadily build up the indication toward the temperature being measured.

When the voltage from the linear slope generator reaches the amplifier voltage the voltage comparator sends an output signal to the flip-flop element which then changes state and sends a signal that opens the gate. This disconnects the oscillator from the counter; and the reading of the indicator then remains in the last counted position. This accurately indicates the patient's oral temperature, provided that the linear slope generator used has been designed to delay sending the signal to the gate until after this temperature has stabilized.

This stabilization time is undesirably large because the patient's oral tissues have to increase the temperatures of the probe, sheath and thermistor until they are equalized with the oral temperature. The time can be reduced by arbitrarily increasing the current from the constant-current source in accordance with calculation of the difference between the thermistor-supplied voltage at the shortened time interval and what it would be at the estimated longer time period. This period, estimated for an average oral temperature, nearly always involves some error. To eliminate this error this invention preferably comprises a preheating system. An example of this system is indicated in the detailed preheating-circuit part of the block diagram of FIG. 10.

PREHEATING SYSTEM AND ITS OPERATION

When the operator picks up the probe for use the preheating switch 96 is closed. Although this optionally may be done by a separate switch or by built-in delay on the power switch, preferably removal of the probe from its storage place operates this switch. In FIG. 1 one of the spring clips 97 moves the switch when the probe is withdrawn and the clips move toward each other. Here the probe is stored on the cover 3; optionally it may be in a socket within the case 1. In FIG. 15, the spring clips 74 similarly move the preheater switch. Here also the probe optionally may be stored inside a box (in this case the box 70).

The closure of switch 96 causes current to flow thru the differential amplifier 98, which comprises: four resistances 99, 100, 101, and 102; an optional potentiometer 103; and two transistors 104 and 105. This amplifier amplifies the differential voltage between the voltage from the measuring thermistor 45 and a voltage determined by the resistances 99, 100, and (where used) potentiometer 103. The potentiometer is optionally used to allow adjustment of the said differential voltage; when it is optionally not used this voltage is fixed and predetermined.

The voltage from the amplifier goes thru line 108 and current-limiting resistance 110 to the transistor 112. This transistor acts as a current switch, switching current to the preheater 46. This preheating resistance, (preferably the preheating thermistor of FIG. 4) is located adjacent the temperature-measuring thermistor 45. Because these elements 45 and 46 are fixed to the heat-conducting metal plate or foil 44, and 44 is fixed to the free end portion of the probe, the preheating resistance 46 heats the probe by direct metal contact at its end, and the measuring thermistor is further heated by the mouth or other object being temperature-measured by quick conduction of heat through the plate 44 to 45. The air in clearance 54 thus has little or no delaying effect, because of its insulation, on the elements 45 and 46. The current to the preheating resistance 46 is limited to a desired amperage by resistance 114, to prevent overshoots of temperature-caused voltage.

The current flowing thru the preheater generates heat in it that is proportional to the current. This heat raises the temperature from that of the ambient air in the room to the approximate average temperature in the mouth or other cavity where measurement is desired — for example, 98.6 degrees Fahrenheit. Before the probe is inserted in this cavity: when the measuring thermistor reaches this predetermined approximately average temperature the output of amplifier A is of sufficient value, when applied to transistor 104 via resistor 116, to cause reduction of the current output from transistor 112 to the preheater. This reduction approximately stabilizes the heat in the preheater which is also the heat in the probe, sheath and measuring thermistor.

At the approximate time of measuring a temperature, the operator actuates the manual power switch (95 or 78) and, with reference to FIG. 10, the circuit to the preheater is opened and the temperature-measuring circuit is closed. As explained above, within a predetermined time period the temperature of the probe now rises (or falls) to the stabilized temperature of the patient's mouth. But with the provision of the above explained preheating system, this estimated time period is low. For example, with this invention the estimated time period may be ten seconds, which is enough above the time of bringing the probe temperature from the preheated value to the average oral temperature to insure its stabilization and accurate measurement.

The output from the counter (at times in changing state and at times steady state) goes into the decoder-driver which converts it into the proper format for operating the digital indicator and sends signals to the indicator.

This indicator comprises 3 sets of seven-segment alpha-numeric displays. Each unlit set of seven forms the shape of the "8" shown in FIG. 11. By lighting selected ones of these segments each set can be made to indicate any numeral from "0" to "9."

Figure 11:
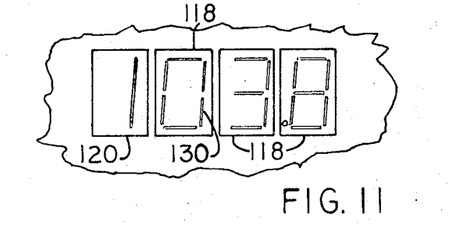
FIG. 11 is a plan view, partly broken away, of the top cover of the box, showing the digital readout.

Each rectangular block (segment-set support), 118, has a black ceramic base; and above all the sets there is a polarized filter cover, transmitting light outward but little or none inward. Each segment comprises a known, commercially available, red-light-emitting substance. Because of the black substrate on which the segments are mounted certain ones of the segments are lit to indicate the degrees in the above-mentioned tens, units and tenths.

Figure 12:
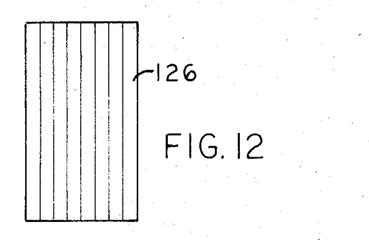
FIG. 12 is a bottom plan view of the bottom plate of the readout block of FIGS. 13 and 14.
Figure 13:
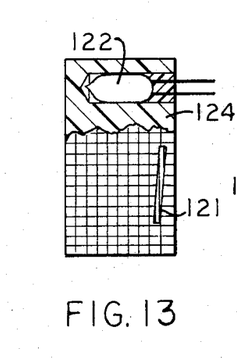
FIG. 13 is a detail top view, partly in horizontal section, of the readout block that, when needed, indicates the numeral "1" of degrees of 100 or above.
Figure 14:
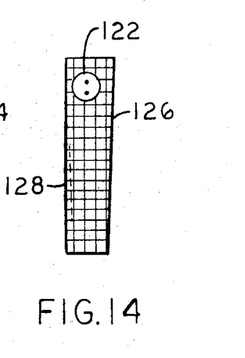
FIG. 14 is a side elevational view of the block of FIG. 13.

Until the measured temperature exceeds 99.9° only three sets of the segments are lit. On exceeding this temperature the block 120 is energized. As indicated in FIGS. 12, 13, and 14, this block comprises a single window, 121, which has the same size as two of the uprightly-aligned light-emitting segments of the blocks 118.

When 99.9° of measurement are exceeded the decoder-driver supplies current to the small incandescent lamp 122, which shines thru the transparent plastic 124 and thus illuminates the red-painted back surface 126 of block 120. This surface has an inclination relative to the front surface 128, thus reflecting a large portion of the light thru the window 121. Another result of the slope of 126 is that any imperfections of slight ridges or mounds on the surface 126 and its red coating cast little or no interfering shadows. Except for this back surface and the window the whole of block 120 is suffered by black paint, thus preventing exit of light except at the window 121.

When the lamp 122 is thus lit the numeral "1" is indicated by the side of the numeral indicated at 130, which in oral-temperature measurement of course is always "0," when the "1" is shown.

In the following claims, the word "plastic" signifies natural or synthetic rubber or other plastic.

We claim:

1. An electronic thermometer for measuring the temperature of an object, comprising:
   a source of electric current;
   temperature sensitive means attached to said probe for measuring the temperature of the probe and of said object and supplying an electric signal voltage proportional to the temperature;
   an amplifier, connected to said temperature sensitive means, receiving and amplifying said signal voltage;
   probe-preheating resistance means, attached to said probe;
   a preheating circuit electrically connected to said source, to said probe-preheating means and to said amplifier, comprising a differential amplifier for supplying preheating current to said probe-preheating means;
   means electrically connecting one input of said differential amplifier with said first-named amplifier, comprising electrical resistance;
   means, comprising electrical resistance, for supplying a comparison voltage to the other input of said differential amplifier;
   temperature-indicating means, comprising a counter, activated by electric pulses;
   means for producing a number of pulses and supplying them to the said counter, said number depending on the magnitude of the voltage output from said first-named amplifier when the said signal voltage is at its maximum value, stabilized with the stabilization of said temperature; and
   means for ceasing the supply of said pulses to the counter when said voltage is at its maximum value.

2. A thermometer as set forth in claim 1, in which the probe's preheated temperature is below the average temperature of said object.

3. A thermometer as set forth in claim 1, in which said probe-preheated resistance means is a second thermistor.

4. A thermometer as set forth in claim 1, comprising a disposable sheath adapted to fit over the said probe.

5. A thermometer as set forth in claim 4, in which said disposable sheath is of resilient material.

6. An electronic thermometer comprising a source of electric current;
   a probe adapted to be positioned relative to an object for measurement of its temperature, comprising resistance heating means for preheating the probe to a predetermined temperature before said measurement, and a measuring thermistor in an end portion of the probe, for measuring said temperature and supplying a signal voltage proportional to the temperature;
   means actuated by said signal voltage for indicating the state of said temperature; and
   a preheating electrical circuit for supplying preheating current to said resistance heating means, comprising: electrical conducting means connected to said source of current; a switch; resistance means for determining a comparison voltage; a differential amplifier for comparing said comparison voltage and said signal voltage and supplying a current proportional to the difference between these two voltages; and conducting means transmitting said preheating current to said resistance heating means.

7. A thermometer as set forth in claim 6, in which said second-named resistance means comprises two resistors and the said preheating circuit comprises a conductor, connected to and between said resistors, for conducting current from the resistors to said differential amplifier.

8. A thermometer as set forth in claim 7 in which said second-named resistance means comprises a potentiometer, for adjusting said comparison voltage.

9. A thermometer as set forth in claim 6, in which said differential amplifier comprises: a pair of transistors; a line connected to and between said transistors; and a resistor connected to said line.

10. A thermometer as set forth in claim 9, in which said differential amplifier has an output connection, and said preheating circuit comprising transistor means, connected to said output connection, to increase the amperage of the current from said connection.

11. A thermometer as set forth in claim 10, comprising means, connected to said output connection and to said transistor means, to predetermine the said increase of amperage.

12. A thermometer as set forth in claim 11, in which said resistance heating means is a second thermistor, mounted on said probe.

13. A thermometer as set forth in claim 6, comprising a second, temperature-measuring-circuit switch, and means for turning off one of said switches and turning on the other switch, substantially at the same time.

14. A thermometer as set forth in claim 6, comprising a disposable sheath, adapted to fit over said probe.

15. An electronic thermometer, comprising:
a probe element adapted to be positioned adjacent to an object for measurement of its temperature, having a free end portion and a channel terminating at said free end portion;
electric wiring in said channel;
an element of heat-conducting metal, fixed to said free end portion;
a probe-preheating thermistor, fixed to said metal element, connected to part of said wiring;
a temperature-sensing thermistor, fixed to said metal element, connected to a second part of said wiring, supplying a signal voltage that is substantially proportional to the temperature of said probe;
electrical means connected to and supplying probe-preheating current to said first-named wiring part and to said preheating thermistor, comprising: a differential amplifier connected to said first and second wiring parts; means for supplying a comparison voltage to said differential amplifier; and electrical resistance means for limiting said probe-preheating current to a desired amperage; and
temperature-measuring and indicating means electrically connected to said second wiring part, for receiving said signal voltage and converting it into indication of degrees of temperature.

16. An electronic thermometer comprising:
a probe adapted to be positioned adjacent an object for measuring its temperature, comprising:
an elongated probe element; a metal, heat-conducting element attached to a free end of said elongated probe element; temperature-sensing electrical resistance means, fixed to said metal element, supplying a signal voltage that is proportional to the temperature of said probe; and probe-preheating resistance means, fixed to said metal element;
electrical means connected to and supplying probe-preheating current to said probe-preheating resistance means, comprising a differential amplifier, with one input connected to said probe-preheating thermistor and the output connected to said temperature-sensing thermistor, and means for supplying a comparison voltage to the other input of said differential amplifier;
temperature-measuring-and-indicating means, electrically connected to said temperature-sensing resistance means, for receiving said voltage and converting it into indication of degrees of temperature.

17. An electronic thermometer, comprising:
a probe element adapted to be positioned adjacent to an object for measurement of its temperature, having a free end portion and a channel terminating at said free end portion;
electric wiring in said channel;
an element of heat-conducting metal, fixed to said free end portion;
a probe-preheating thermistor, fixed to said metal element, connected to part of said wiring;
a temperature-sensing thermistor, fixed to said metal element, connected to a second part of said wiring, supplying a signal voltage that is substantially proportional to the temperature of said probe;
electrical means, connected to and supplying probe-preheating current to said first-named wiring part and to said preheating thermistor, comprising means for reducing the magnitude of said preheating current as the preheated temperature of said probe approaches a predetermined state; and
temperature-measuring and indicating means electrically connected to said second wiring part, for receiving said signal voltage and converting it into indication of degrees of temperature.

18. A thermometer as set forth in claim 17, comprising a probe-element sheath, in which an inward part of said probe element comprises a handle portion; and stop means at said handle portion, adapted to engage and stop assembling movement of said sheath.

19. A thermometer as set forth in claim 18, in which: the said probe-element sheath has a resilient portion and when not on the probe has a length less than the distance between said stop means and the outermost tip part of the probe element; the said resilient portion allows stretching of the sheath until its inward end abuts said stop means; and said probe element comprises means at said handle portion for detachably holding said inward end in place on the probe element, against the resiliency of said resilient portion.

20. An electronic thermometer comprising:
a probe for measurement of the temperature of an object, comprising temperature-sensing means in an end portion of the probe, for measuring said temperature and supplying signal voltage proportional to the temperature;
a probe sheath, adapted to fit over said probe having an open end portion adapted to move over the free end of the probe in assembly of the probe and sheath;
means for supplying electric current to said temperature-sensing means; and
means actuated by the said signal voltage for indicating the state of said temperature;
the said probe having a handle portion; and an adjacent sheath-moving means, manually movable relative to the probe and to the sheath, and having a sheathdcontacting-part and means responsive to movement of said sheath moving means toward said end portion of the probe to dislodge the sheath from said probe.

21. An electronic thermometer as set forth in claim 20, in which said probe provides slide-bearing means for movement of said sheath-moving means.

22. A thermometer as set forth in claim 20, in which an outward, tip part of said probe sheath comprises a relatively thin wall of resilient plastic, and an inward part of said sheath comprises a relatively thick wall.

23. A thermometer as set forth in claim 20, in which the said thick wall is of plastic.

24. A thermometer as set forth in claim 20 in which said probe sheath compositely comprises two aligned parts and bonding material between adjacent end portions of said parts, and in which at least the outward one of said parts is of said resilient plastic.

25. A thermometer as set forth in claim 20, in which said probe sheath is of integral plastic.

26. A thermometer as set forth in claim 25, in which said probe sheath comprises an outward thin-wall part and an inward thick-wall part.

27. A thermometer as set forth in claim 20 in which said sheath-moving means comprises: a socket in said handle portion; a sliding element reciprocable in the general direction of the probe axis, connected to said sheath-contacting part; resilient means, normally holding said sliding element in its position farthest from said tip end; the said sliding element having a portion normally projecting outside said handle portion, and adapted to be manually operable, against the action of said resilient means.

28. A thermometer as set forth in claim 27, in which the said sheath has a length that is normally shorter than the distance between said sheath-contacting part and the outermost tip-end portion of the probe, and comprises resilient material permitting stretching of the sheath until the said inward end portion is in contact with said sheath-contacting part.

29. A thermometer as set forth in claim 20 further including voltage-responsive means to control the indicating means, comprising: counting means for measuring the values of said signal voltage, a slope generator; a voltage comparator for comparing the output voltage from said generator and the said signal voltage; and means actuated by output voltage from said comparator to stop operation of said counting means; and in which said indicating means indicates temperature in degrees and tenths of degrees.

30. A thermometer as set forth in claim 29, in which said indicating means comprises: three blocks having visible surfaces, with windows at said surfaces; three segmented members, one back of each of said windows, for providing light thru said windows and indicating tens, units and tenths of degrees; a block of substantially transparent material, for indicating the numeral "1" of 100 or more degrees, having a visible surface, a window in said surface, and a back surface that is inclined relative to said visible surface; an integral, unsegmented member back of said last-named window for providing light indicating "1" thru said window; a coat of black material covering said visible surface and the side surfaces of said last-named block, excepting at its window; and a coat of light-reflecting material on the said back surface of the last-named block, below its window.

31. A thermometer as set forth in claim 20 having supporting means that comprises: a board and container; means on said board for detachably holding said container thereon; means on the board for detachably holding thereon a group of disposable probe sheaths of the above-specified type; and means for detachably holding a sheet of paper on the board in position for recording thereon the temperature.

32. A thermometer as set forth in claim 31, in which said means for detachably holding said container and group on the board comprise a headed stud between adjacent ends of the container and group and spring-biased fasteners at other ends of the container and group.

33. A device as set forth in claim 31, in which said supporting means further comprises a strap adapted to go around the neck of an operator.

34. An electronic thermometer as set forth in claim 20, including thermometer-supporting means, in which said supporting means comprises: means for clasping and detachably holding said probe; a box for detachably storing a group of unused, disposable sheaths for said probe, comprising sockets, each of which is adapted to hold a sheath in position for manual insertion of the probe into the sheath and its surrounding socket.

* * * * *